(12) United States Patent
Bullis

(10) Patent No.: US 8,960,771 B2
(45) Date of Patent: Feb. 24, 2015

(54) HIGH EFFICIENCY VEHICLE

(76) Inventor: James Kenneth Bullis, Sunnyvale, CA (US)

( * ) Notice: Subject to any disclaimer, the term of this patent is extended or adjusted under 35 U.S.C. 154(b) by 892 days.

(21) Appl. No.: 12/658,858

(22) Filed: Feb. 15, 2010

(65) Prior Publication Data

US 2011/0198145 A1 Aug. 18, 2011

(51) Int. Cl.
*B61D 17/02* (2006.01)
*B62D 33/04* (2006.01)
*B62D 35/00* (2006.01)
*B60K 5/04* (2006.01)
*B60K 17/30* (2006.01)

(52) U.S. Cl.
CPC . *B62D 35/00* (2013.01); *B60K 5/04* (2013.01); *B60K 17/30* (2013.01); *B62D 33/04* (2013.01); *B60Y 2200/14* (2013.01); *B60Y 2200/145* (2013.01)
USPC ...... 296/181.5; 105/1.1; 180/291; 296/180.1; 296/181.1; 296/182.1; 296/190.04

(58) Field of Classification Search
USPC ......... 280/400; 105/1.1; 180/291; 296/180.1, 296/181.1, 181.3, 181.5, 182.1, 190.04
See application file for complete search history.

(56) References Cited

U.S. PATENT DOCUMENTS

| | | | | |
|---|---|---|---|---|
| 3,405,778 A * | 10/1968 | Martin | ............................. | 180/24 |
| 3,539,030 A * | 11/1970 | Gerin | ............................ | 180/89.1 |
| 4,269,444 A * | 5/1981 | Emory | ...................... | 296/181.5 |
| 5,181,740 A * | 1/1993 | Horn | .............................. | 280/755 |
| 5,626,310 A * | 5/1997 | Kelly | ................................. | 244/2 |
| 5,941,593 A * | 8/1999 | McCann | ..................... | 296/136.1 |
| 6,932,419 B1 * | 8/2005 | McCullough | .............. | 296/180.1 |
| 7,992,666 B2 * | 8/2011 | Otterstrom | ................... | 180/69.6 |
| 8,267,211 B2 * | 9/2012 | Otterstrom | .................... | 180/165 |
| 2002/0021023 A1 * | 2/2002 | Leban | ........................ | 296/180.1 |
| 2008/0238140 A1 * | 10/2008 | Kejha | ......................... | 296/181.1 |
| 2010/0101876 A1 * | 4/2010 | Misencik | .................. | 180/65.21 |
| 2011/0000723 A1 * | 1/2011 | Bullis | ........................ | 180/65.51 |
| 2011/0109121 A1 * | 5/2011 | Salari et al. | ................ | 296/180.2 |
| 2011/0148142 A1 * | 6/2011 | Kint | ............................ | 296/180.4 |

* cited by examiner

*Primary Examiner* — Joseph Rocca
*Assistant Examiner* — Marc A Scharich

(57) ABSTRACT

The invention is a vehicle for ground transportation that is an aerodynamic shell attached to wheels. The aerodynamic shell is shaped according to airship technology and is elevated such that air flow around the shell is like air flow would be for that shell in flight. The elevation is accomplished with attached structure and attached wheels. Wheels at each side of the vehicle are arranged in wheel trains that are filled in and streamlined to form secondary aerodynamic units, with space between wheels used for equipment. The invention requires changing the position of the engine from its usual place that is low and at the front of the vehicle to a very different position that is high and at the rear of the vehicle.

4 Claims, 12 Drawing Sheets

HIGH EFFICIENCY VEHICLE

This is a continuation of application Ser. No. 12/658,858 as an election under that application.

This patent document contains material that is subject to copyright protection. Facsimile reproduction is allowed of the patent document or the patent disclosure as it appears in the Patent and Trademark Office patent file or records as allowed by US patent law, but otherwise all copyright rights are reserved except for use of material where this patent document is acknowledged as the source.

BACKGROUND OF THE INVENTION

1. Field of the Invention

This present invention relates to motor vehicles.

2. Description of the Prior Art

Present interest is in making surface transportation vehicles that would move at high speeds without need for the high power required by familiar vehicles. Configurations from the aircraft world offer large benefits if appropriate measures are taken to fully utilize their aerodynamic performance, and doing this entails unconventional apparatus that is not a part of the conventional ground vehicle world. Given the present day problems with energy, failure to utilize the incredibly low aerodynamic drag of the well known airship in ground vehicles is a glaring failure to innovate.

The present invention is discussed here in reference to existing transportation systems. Traditional design activities address aerodynamic drag force, rolling resistance drag force, and dynamic effects of lateral forces due to handling and cross wind situations. Aerodynamic drag force impedes motion in the intended travel direction. Cross wind aerodynamic force is among the destabilizing lateral forces that also include side forces on wheels that arise in real operational situations. The term lateral means a direction parallel to the surface and perpendicular to the travel direction. A longitudinal vehicle axis is parallel to direction of travel. Airship experience has often been applied to the motor vehicle world, especially that of the automobile, but this work has always stopped short of taking the necessary measures to fully exploit this opportunity.

Strictly speaking, the field of the invention would better be described as heat engine driven vehicles since that is by far the most common situation. This distinction is quite often ignored, but this can lead to serious error. In this document the term engine is generally used since it is the relevant large mass of equipment in most cases. Electric traction motors and batteries can perform similarly, but the mass distribution issues are entirely different. Any apparatus that delivers propulsion energy is an equivalent to the engine specified here.

The heat engine is not a precisely defined article in context of present day concerns about fuel economy and fuel types. It also is somewhat variable in size, being subject to measures to reduce the need for power from such an engine which then dictates smaller mass.

There is much to overcome in the tradition of motor vehicles. Conventional automotive wisdom dictates a bluff body, that descriptive term meaning that the front and rear are much more abrupt than would be appropriate in a serious aerodynamic situation such as that encountered by aircraft. Perhaps this became a fixed tradition since cars evolved from horse drawn carriages where aerodynamic shape was not critical due to relative slow speeds involved. Even the Model T Ford design ignored aerodynamics, and this was due to both relatively low speed for most uses and inexpensive fuel supplies. Public taste is firmly aligned with the familiar; thus the bluff foolishness is well entrenched.

This bluff body limits possibilities to achieve effective aerodynamic operation. The limits of aerodynamic refinement of the bluff body were largely realized in the first decades after the Model T Ford. It seems there was little motivation to raise the vehicle above the ground to improve airflow; in fact, once that bluff body idea is accepted, the better course of action may be to reduce ground clearance. Of course, the stability issues of a high vehicle would probably have been seen as insurmountable, and thus excluded any idea of such a possibility.

Furthermore, it has been a rarely challenged rule that any car must provide side by side seating for at least two adults. This conventional thinking has long precluded aerodynamic progress anywhere close to that which is possible.

An exception to the bluff body was attempted with the studies by A. Morelli reported in "Impact of Aerodynamics on Vehicle Design", Proceedings of the International Association for Vehicle Design, SP-3, p. 70-98 (1983). A. Morelli was actually studying shapes that would enable operating a vehicle close to the ground, as demanded by the automotive world, yet would perform similarly to ideal aerodynamic bodies based on the teardrop shape. Morelli also accepted, as a fundamental requirement, that side-by-side seating must be provided for in a car.

The concept developed by A. Morelli was successfully shown to achieve the airship level of aerodynamic drag using an idealized model in wind tunnel tests. While the resulting form was consistent with the width requirement for side-by-side seating, the resulting form was very inefficient in load carrying volume considering its overall length. This inefficiency was due to the rapid taper of the basic teardrop shape as well as the camber that he added to cut down on vortices. Neither did the benefits carry through very well when actual wheels were attached. Though it was a significant attack on the bluff body tradition, it seems to have gone by mostly un-noticed, though a recent high efficiency vehicle known as the Aptera is an exception.

We know it is theoretically possible to do many times better, based on the airship tradition. This is notably represented by wind tunnel studies of the USS Akron by Hugh B. Freeman reported in NAC Report No. 432. The requirement for free flow aerodynamic conditions is very apparent from observation of the measurement procedures used in these studies. Wind tunnels are far larger than the models so that floor, walls, and ceiling are much separated from the models under test.

Without being focused on aerodynamics as such, searching for a way to make a closed car that would give the advantages of a motorcycle without the hazards of such, led to U.S. Pat. No. 7,338,061 Bullis, Mar. 4, 2008. This provided a wheel system that makes a narrow motor vehicle stable. An unexpected benefit of this approach was a remarkably stable steering process that developed out of the articulated arrangement of this prior invention. The reduced frontal area immediately results in reduced aerodynamic drag, which would be applicable to whatever shaping would then be implemented. Further development of this concept using known aerodynamic concepts showed that major improvements in aerodynamic efficiency were possible. These included measures to shape the main vehicle body for low aerodynamic drag, together with measures that elevated the passenger carrying body above the roadway such that the shaped body would perform like it would in free flow conditions. Patent application Ser. No. 11/893,497 Bullis, Aug. 16, 2007 discloses such apparatus. Thus it was found that the unusual stabilizing features as specified in that previous U.S. Pat. No. 7,338,061 Bullis, Mar. 4, 2009 could serve both to enable a narrow vehicle and to enable an elevated aerodynamic body of that vehicle. This was a major breakthrough in the design of efficient transportation systems.

In application Ser. No. 11/893,497 Bullis, Aug. 16, 2007 the stabilizing apparatus involved various wheel arrangements to prevent roll-over situations. Such wheel arrangements involved wheels offsetting to an outside of a turn that enabled increased, roll resisting torque. In particular, the front wheels of these vehicles were not used to initiate turns. Also noted were configurations providing judiciously placing equipment of significant weight into wheel train arrangements aligned with wheels that also minimized roll-over hazards. Weight distribution in the upper, elevated aerodynamic body was not addressed in detail.

Also discussed in application Ser. No. 11/893,497 Bullis, Aug. 16, 2007 were measures whereby tall vehicles which resulted from elevated body arrangements that were subject to cross wind hazards could be made less vulnerable by minimizing forces due to lateral air flow.

Beyond the world of automobiles, much of the energy used in transportation is used by heavy truck transportation. Applications that would improve efficiency of larger vehicles such as trucks were limited with the stabilizing arrangement of U.S. Pat. No. 7,338,061 Bullis, Mar. 4, 2008, because it involved a two axis joint where the two axes were offset. This offset arrangement entails significant structure to transfer heavy loads through that joint. Even for lighter vehicles, there is a weight penalty due to the offset arrangement. The arrangements also tended to have an affect on turning radius that was somewhat limiting for cars, but especially for long trucks.

The large truck represents the most significant opportunity to save energy. The engine part of such vehicles is normally low for overall stability reasons, so aerodynamic flow under that part of the vehicle is limited. The more rearward airflow is fully turbulent beyond that. Worse still is the fact that the very common large semi-trucks actually present a double aerodynamic event due to the separation of the tractor and trailer parts.

Heavy trucks are also subject to significant energy loss due to a different mechanism. Adding to aerodynamic drag effects, there is a friction like loss that is mostly due to rolling resistance of rubber wheels on paved roads. Patent application Ser. No. 12/454,745 Bullis, May 21, 2009 disclosed a hybrid wheel system that nearly eliminates rolling resistance of highway truck wheels when operating on steel rails placed on a paved roadway, yet have full capability to operate when the steel rails are absent. That same application discussed, as prior art, railroad service vehicles adapted to run on railroad rails or paved roads as alternatives. With the hybrid wheel system the shift from operation on rails to operating on paved surfaces is accomplished by the combined wheels having available sizes that simply take over as appropriate for respective surfaces, be they rail or paved surface.

Rear engine vehicles or mid engine vehicles are known. These include the originally imported Volkswagen car, Volkswagen buses and vans, Porsche sports cars, Toyota MR2 and such which are exceptions to the more general front engine vehicle. None of these broke the traditional design rule that the car should be as low as possible to the road, except perhaps the Volkswagen bus. The box-like form of the Volkswagen bus was shaped for utility such that it would not qualify as an aerodynamic body. It is, however, a remarkably high vehicle given its standard wheel base width. It is often thought that stability is due to the relatively low engine that is a flat block form. It is obvious that this low engine would give meaningful degree of stabilization in a constant radius turning condition. Not obvious is the advantage of the rear position of that engine, away from the pivoting wheels that control vehicle direction.

The trailer part of most large semi-trucks is notably high above the road. Stability is obviously a manageable issue for these articulated vehicles. In contrast the engine in the tractor part is set quite low to the ground. The low engine is somewhat relevant to how the trailer load is stabilized, but it seems that proximity of this mass near to the front wheels makes it particularly important to keep it low. Though there have been attempts to smooth the transition between tractor and trailer, the basic tractor trailer arrangement is about as wrong aerodynamically as it could be. Both tractor and trailer are the most bluff of bluff bodies and the combination represents two, almost separate, aerodynamic casualties.

SUMMARY OF THE INVENTION

The present invention is a vehicle for efficient ground transportation that is a unified aerodynamic body configured for airship-like performance, but with wheels on a roadway. This body is a unifying shell that encloses a payload space, an engine, and a front mounted control station that accommodates a driver. Operation that approximates aerodynamic performance of the airship requires that the body be high enough above the road surface to eliminate the effect of that road surface on air flow. Therefore, the engine is significantly higher than usual for truck engines. Applicability extends to both articulated vehicles and rigid vehicles, including straight trucks, semi-trucks, buses, and automobiles. This discussion relates to trucks.

Initiating a turning action causes high lateral acceleration effects that vary over vehicle length. Stability depends on position of the large engine mass along this length. Because usual applications involve control of travel direction with pivoting wheels at frontal positions on the vehicle and these pivoting wheels impart the high lateral acceleration, this new rule typically dictates an engine location near rear wheels where lateral acceleration is minimized.

Also to achieve airship-like operation, axles, drive trains, differentials, and much of the usual underbody truck equipment is arranged to minimize interference with air flow or shaped to minimize various drag effects; some parts were located internal to the main body and some remained external. Further external equipment included electrical apparatus to augment traction power from the engine. By arranging the external equipment to be in line with wheels along the vehicle length on each side, smaller, additional aerodynamic units were formed that have size and shape that minimally affects said air flow and have minimal self drag. The low positions of these additional units provided a lower overall vehicle center of gravity, thereby enhancing stability.

In relation to the conventional semi-truck, this invention is of special interest because the air drag effect of the gap between tractor and trailer is eliminated yet the semi-truck wheel arrangement is retained.

DETAILED DESCRIPTION OF THE PREFERRED EMBODIMENT AND VARIATIONS

Figure 1:
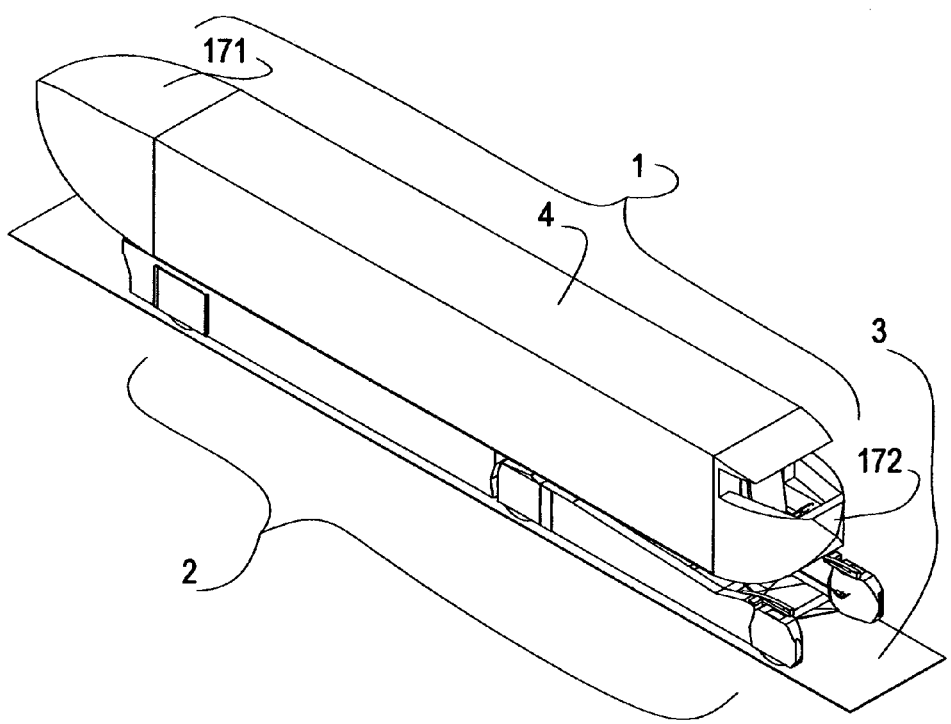
FIG. 1—Large truck having unified aerodynamic main body with secondary wheel train units.

The present invention is a vehicle for efficient ground transportation that is a unified aerodynamic body configured for airship-like performance, but with wheels on a roadway. This body is a unifying shell that encloses a payload space, an engine, and a front mounted control station that accommodates a driver. Because aerodynamic operation of this vehicle is to approximate aerodynamic operation of an airship in flight, the body must be high enough above the road surface to eliminate the effect of that road surface on air flow. Therefore, the engine that is within that body is at a higher position than usually seen in conventional vehicles such as trucks. Since the engine is typically a significant mass, a high position of that mass presents an instability problem that must be remedied in the invented concept.

This concept is applicable to a variety of vehicle types including straight trucks, semi-trucks, buses, and automobiles that are subject to significant aerodynamic drag forces. The roadway is any form of surface that supports rolling wheels, including paved roads, rails on paved roads, or railroad rails as with existing railroad tracks. The invention has equivalents that go beyond wheels to include tracked vehicles, snow vehicles running on skis, water born vehicles, or any vehicle arrangement involving an aerodynamic flow over a body near a boundary surface.

The embodiment design shown here adapts airship research to the automotive field with the objective of breaking the automotive vehicle tradition of the bluff body. Airship research carried out prior to WWII culminated with a high performance aerodynamic body shape that is here used as a vehicle body. Wind tunnel tests were carried out in those years producing air drag force measurement data that can be used to design this high efficiency vehicle. This data is especially complete for the USS Akron shape, even including drag force data for the model at a variety of pitch angles. For vehicle speeds of interest the drag force can be quite accurately determined, especially for data from a $\frac{1}{40}$ scale model reported by Hugh B. Freeman in NAC Report No. 432, (1932) that is approximately the same as a typical automobile and within very meaningful scaling range for large trucks.

The critical premise of these measurements was that the aerodynamic flow in the wind tunnel must not be disturbed by any flow constraining surface. Of course, there is always a reality of physically supporting a model in a wind tunnel, and the techniques used for such support are also relevant since we obviously need to support the vehicle body on a wheel system if we are to turn this into a useful road vehicle such as a truck, bus, or automobile.

This airship is a highly refined version of a simple shape of an elliptical body of revolution having its axis aligned with the vehicle travel direction. The general function of this kind of shape is to produce air flow having radial symmetry about the body and streamlined in shape that avoids separation of the air stream from the body. Radial symmetry means that air flow speed is held roughly constant in any radial direction from a point, for a given speed of the vehicle through the air. The result of these measures gives the lowest possible drag force. This works well at flight altitude but not nearly so well near the ground. Wind tunnel tests characterized aerodynamic drag coefficient of airships at altitude.

If the road is close to the bottom of the vehicle the air flow has to be higher to squeeze through a smaller space, or there has to be greater air flow rate through the more open spaces. Height is thus the first part of the solution. If the flow spreads around the body in a radial pattern that is symmetrical about the body axis, the spreading under the vehicle is less subject to confining effects of the road surface. A rounded vehicle bottom would give the desired, radial spreading pattern. If somewhat flattened on the bottom, making the flat part more narrow tends to enable a more radial like spreading pattern to develop closer to the body. Thus, we would like to have vehicles that are as narrow and as round underneath as possible, with as much separation of the vehicle above the ground as possible.

The generally accepted requirement for side-by-side seating in automobiles is in direct opposition to this requirement for narrow, rounded bottom vehicles. Embodiments in the automotive category that are included in this discussion, include the innovation of tandem seating which enables body shaping that achieves this objective. Payload requirements for trucks limit what can be done on the underside of truck bodies, but this remains an objective that can be partially achieved in many cases.

It is generally accepted in the automotive world that cars must be low so as to have a low center of gravity, so there is usually no serious effort to raise car bodies above the road. The same is true for trucks as far as their heavy engines are concerned, though cargo space is commonly well above the wheels for simplicity in truck construction. Higher truck bodies seem to be manageable from a stability point of view. However, since the engine part of the vehicle is normally low for overall stability reasons, the air flow is first determined by this part of the arrangement, and more rearward airflow is fully turbulent beyond that. Worse still is the fact that the very common large semi-trucks actually present a double aerodynamic event due to the separation of the tractor and trailer parts. It appears that vehicles are badly designed in general since they fail badly at minimizing drag. Clearly, the entire truck or other vehicle body should be a single aerodynamic unit as high as possible above the road. Though it would be desirable that the shape be that of the ideal airship, compromises can be made with practical requirement yet still accomplish an aerodynamic performance is more like that of the airship than that of the usual rectangular boxes that we now see in most applications.

The same concept applies to automobiles, but it is direct contradicted by the conventional automotive wisdom that dictates a bluff body. Acceptance of the bluff body as being unavoidable, limits hope for achieving effective aerodynamic operation. If that erroneous approach is adhered to, it may not be meaningful to raise the vehicle above the ground to improve airflow; in fact, once that bluff body idea is accepted, the better course of action may be to reduce ground clearance. It is possible that by reducing air flow under the vehicle that the air flow catastrophe of wheel wells can be minimized. There is also a long held belief in the virtues of a low center of gravity to enable stable road handling performance. This conventional thinking has long precluded aerodynamic progress anywhere close to that which is possible. An exception was attempted with the studies by Morelli (1982). Morelli was actually studying shapes that would enable operating a vehicle close to the ground, as demanded by the automotive world, but he included in his test runs a starting point that was about half the width of his flattened body vehicle. At this height the drag was not too different from that which would be expected in free flow. This work helped validate the approximate height requirement for the present invention.

This height, of course, presents the need for stabilizing features that are significantly different from those now in conventional use.

The more apparent vehicle stability problem is that of constant radial acceleration in a turn, which causes an overturning force on any vehicle that causes instability as a function of velocity, turning radius, mass, and center of gravity position relative to a roll axis set by wheel position on a road. This radial acceleration is a lateral acceleration that is about constant over a length of a vehicle which can develop into a condition that will cause a vehicle to roll over. However, there appears to be a more critical condition that comes about due to control of a vehicle in initiating a turn. Initiating a turning action can cause extremely high lateral acceleration effects that vary over vehicle length. Stability depends on how mass is positioned along this length, and of course, the large mass concentration of an engine is the most critical placement issue. Because usual applications involve control of travel direction with pivoting wheels at frontal positions on the vehicle and these pivoting wheels impart the high lateral acceleration at the frontal point, this new rule typically dictates an engine location near rear wheels where lateral acceleration is minimized. In some cases, engine placement behind rear wheels can create a helpful force which translates to a force acting at the base of the rear wheels that acts to oppose the roll destabilizing forces. The key point is that lateral acceleration does not cause a lateral force unless there is a mass that is accelerated. This will be discussed in reference to the preferred embodiment as that is detailed here.

This can be compared with the prior art of elevated aerodynamic bodies disclosed in application Ser. No. 11/893,497 Bullis, Aug. 16, 2007, where a more complicated wheel arrangement was discussed without emphasis on upper engine weight. There are significant similarities, but the weight carrying arrangement of the present arrangement is more closely related to conventional semi-truck arrangements. Those articulated vehicles demonstrate that stability is possible with a high trailer part. The present invention reverts from the offset two-axis joint and wheel system of application Ser. No. 11/893,497 to something more like that of the semi-truck, except the cab of the semi-truck is now attached to the trailer part of the vehicle and the engine is fixed at the rear of the trailer.

FIG. 1 shows the preferred embodiment that is a large vehicle with an articulated wheel system having an aerodynamic shell as a single unit body 1 that provides the main qualities of airship aerodynamics. Wheel system 2 adapts the airship features for operation on a roadway 3. Forward fairing 172 and rear fairing 171 are an adaptation of ideal fairings that are merged with a rectangular payload box 4 to form a single unit main body that has a low aerodynamic drag coefficient that is made possible, in spite of the proximity of the ground surface 3, by the wheel system 2. This six wheeled arrangement is representative of any semi-truck or other vehicle having at least these kinds of wheels.

Figure 2:
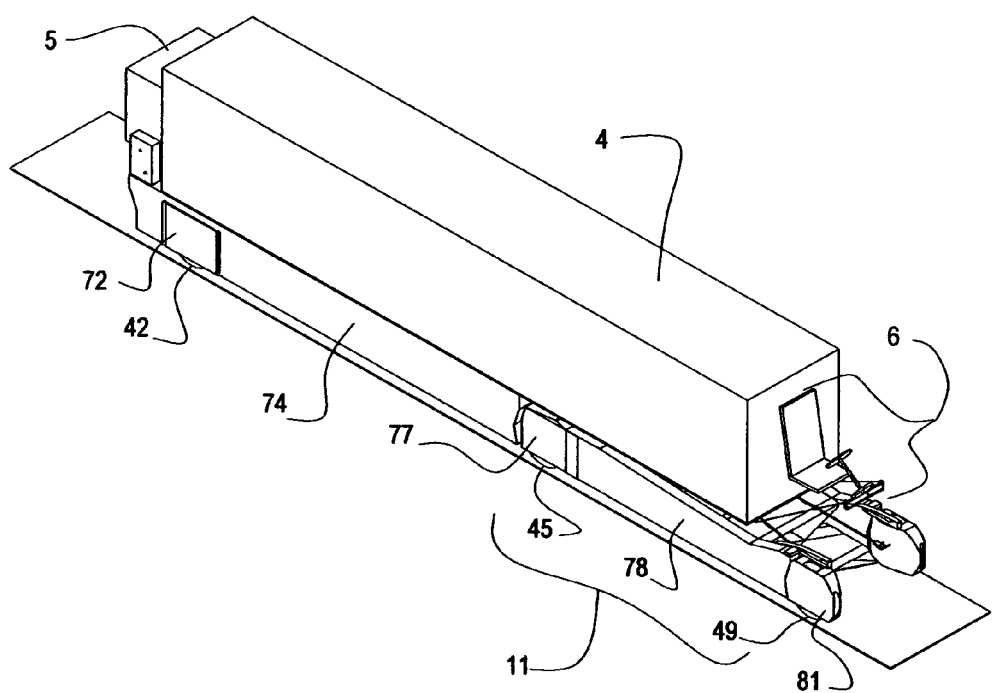
FIG. 2—Large truck with fore and aft fairings removed to show engine and control station positions.

That single unit body 1 is an enclosure of parts made visible in FIG. 2 by removal of the ends 172, 171 of the outer shell. This is an articulated arrangement like that of a semi-truck with a tractor in the front pulling a trailer.

In the present vehicle, the frame and wheel arrangement of such a tractor is retained as a lower carriage 11 with a similar connection to a trailer with a two axis joint, that would usually be called a fifth wheel. The engine of the tractor is eliminated and a functional replacement is attached at the rear of the payload box 4 as a transverse engine 5. The control station of the tractor is also eliminated and a functional replacement is attached to the front of the payload box 4. Thus, the single unit body 1 is enabled to enclose the payload box 4, the rear engine 5, and the control station parts 6. Parts are simply represented in the illustration without complete detail. The payload box 4 of the present vehicle is shifted forward compared to the payload box of the referenced conventional semi-truck since it is not necessary to allow for motion between the trailer and the tractor cab of a semi-truck with the invented arrangement, where the tractor cab is now part of the single main body 1.

Further detail is discussed in reference to FIG. 2. The trailer part includes the combination of the payload box 4 and rear trailer wheels represented by right rear wheel 42. A compartment 74 has structural importance as part of the trailer part 4. An upper part of a two-axis joint that links to an under-carriage 11 below is built in attachment to the payload box 4 at a forward position on that payload box 4.

The under-carriage part 11 includes four wheels represented by right carriage wheels 45, 49 attached to a rigid frame that includes a compartment 78 as part of that frame. Note that the right rear under-carriage wheel 45 and its left side counterpart are representative of multiple such rear under-carriage wheels similar to the common practice with very large semi-trucks. The single unit body trailer extends significantly ahead of the attachment point on the under-carriage whereby its front aligns approximately with the front of the under carriage 11.

Front under-carriage wheels, as represented by right front under-carriage wheel 49, pivot to cause a turn. The control station 6 fixed to a trailing vehicle part is an unusual feature that involves a control arrangement different for a conventional semi-truck, where all control is from a point fixed to the same frame that the pivoting wheels are mounted on. As such there is a more complicated linkage to the front wheels that requires a linkage through the two-axis joint that provides the main flexible structural connection between the vehicle parts. Brakes are similarly linked, though with hydraulic apparatus the linkage is not particularly different. Of course, the steering could also be hydraulic in implementation whereby it would be simpler in some respects, but the stability of the mechanical linkage would be lacking without some complicated hydraulic arrangements.

Wheels in a line on the vehicle right side include right front wheel 49, right rear carriage wheel 45, and rear trailer wheel 42. These are mostly covered with respective fairings 72, 77, 81. Underbody enclosures 74, 78 are shaped and positioned to form a horizontal tubular arrangement with wheel fairings 72, 77, 81 when vehicle is traveling on a straight line path. This is referred to as a wheel train which functions as a secondary aerodynamic unit. Such wheel train units 10 are on each side of the vehicle.

Also to achieve airship-like operation, axles, drive trains, differentials, electrical apparatus to augment traction power from the engine, and much of the usual underbody truck equipment is arranged to minimize interference with air flow or shaped to minimize various drag effects. Some parts were located internal to the main body 1, some were located to the compartments 74, 78 and some remained external. By arranging much equipment to be in line with wheels along the vehicle length on each side, such could be enclosed in smaller, secondary aerodynamic units that have size and shape that minimally affects air flow around the main unit body and have minimal self drag as well. The low positions of these additional units provided a lower overall vehicle center of gravity, especially so given that electrical equipment includes heavy batteries. Thus, these wheel train units are important in enhancing stability. The parts that remained exposed were individually shaped to function as low drag bodies or enclosed in fairings that achieved the same effect.

Figure 3:
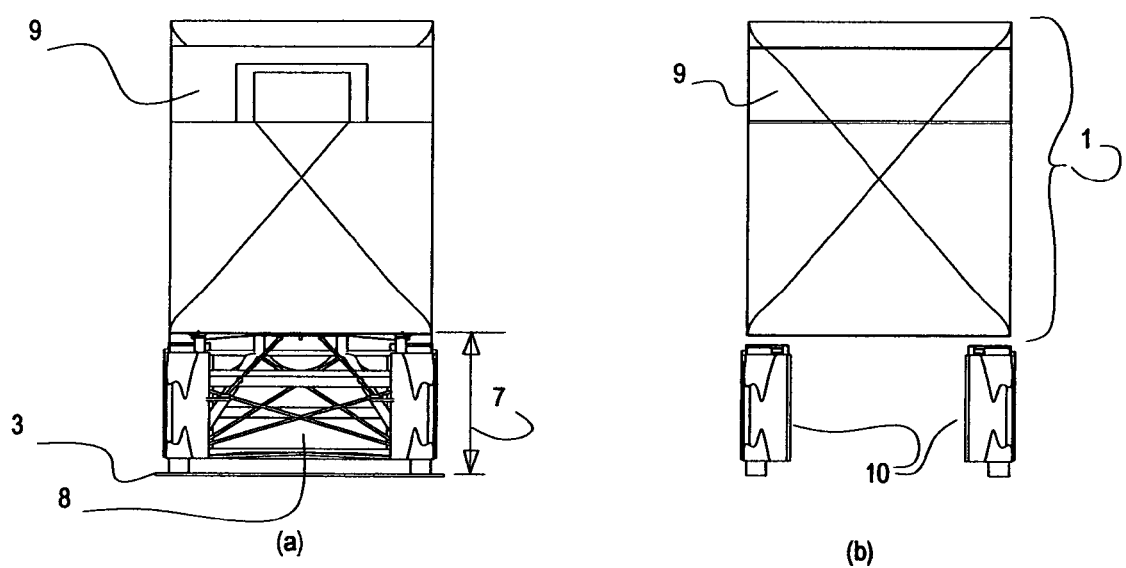
FIG. 3—Actual large truck detail (a) compared to approximate aerodynamic equivalent (b) of elevated main body and wheel train units, where road surface effect is eliminated due to height.

FIG. 3 demonstrates the aerodynamic objective of this arrangement. FIG. 3 (*a*) shows a view of the front of the vehicle on the same roadway 3 and FIG. 3(*b*) indicates the aerodynamic functional equivalent that is the main objective here. The unit body 1 is significantly elevated at a height 7 above the road. Due to that height 7 above road surface 3 that road surface 3 has much minimized effect; this being an important justification for not showing it in the aerodynamic equivalent illustration of FIG. 3(*b*).

In FIG. 3(*a*) vehicle structural apparatus and other equipment 8 are clearly visible between that road 3 and the bottom of that unit body 1. Viewed items 8 under the body are both sparse, small in cross section in this view, and specially shaped to minimize aerodynamic drag, thereby becoming invisible in the aerodynamic equivalent in FIG. 3 (*b*). Much equipment that might appear under truck bodies is clustered into smaller aerodynamic units 10; doing this entailed significant redesign of truck mechanical equipment to be discussed later. The windshield 9 shown transparent in FIG. 3(*a*) becomes opaque and smoothly integrated with the body in the aerodynamic functional representation. The main interference in usual trucks is a very low mounted engine that strongly interferes with airflow in conventional trucks, and indeed would make much of the efforts to improve aerodynamics be in vain. The high mounted engine 5 shown in FIG. 2 is the remedy for this problem, whereby this most important impediment to aerodynamic performance is removed from view, especially the aerodynamic equivalent. This is a key feature of the present invention. Not only is the height of the body important, the collection of these detailed measures further serves to approximately eliminate the roadway 3 from consideration in the aerodynamic flow analysis. Thus it is not shown in the functional aerodynamic representation of FIG. 3(*b*).

Drag of the smaller aerodynamic units 10 is functionally second order in relation to the drag of the main unit body 1 but this requires attention to detail to avoid multiple air interactions over the length of these units 10. This entails fairings that act like the enclosures used on high speed trains for that same purpose.

Figure 4:
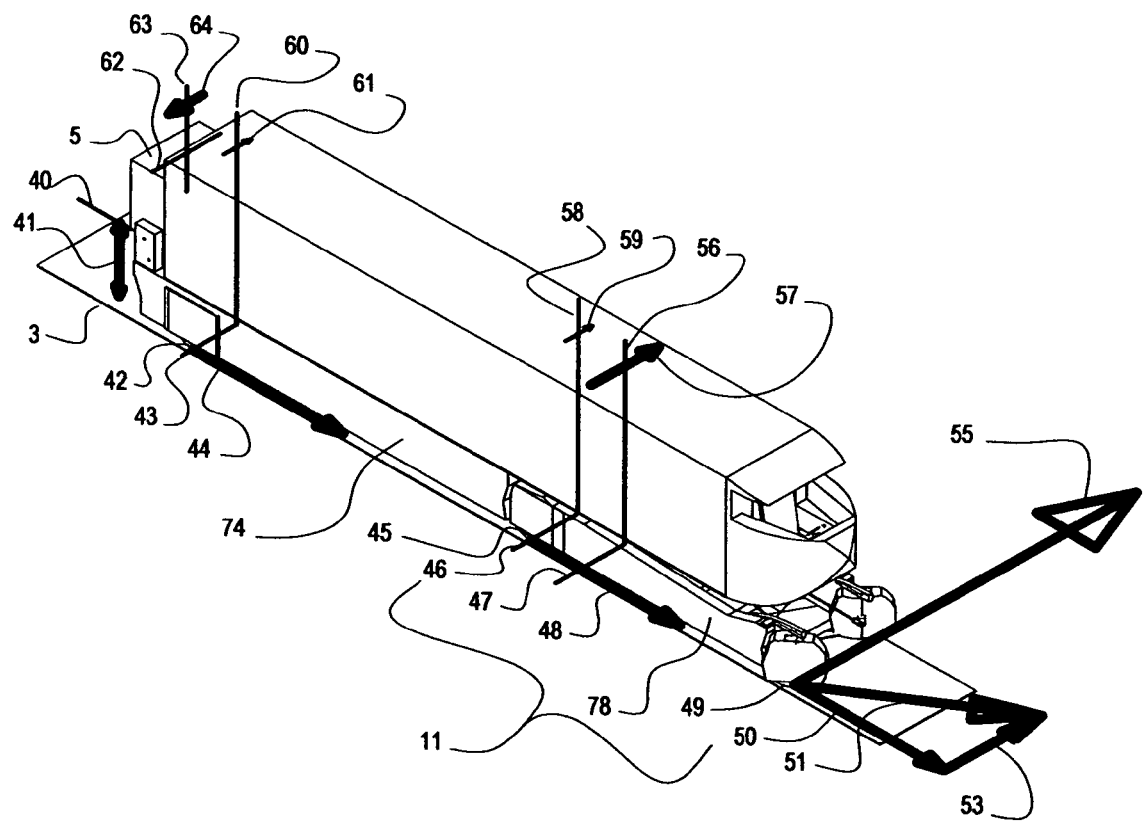
FIG. 4—Large truck with articulated wheel system initiating a turn, with illustration of velocity and acceleration vectors explaining rule for overcoming instability of high engine, with resulting engine position near rear wheels.

FIG. 4 addresses the stability issue which is much exacerbated by the need to make the engine high to enable the clear underneath path. It certainly breaks the usual assumption that the very heavy engine should be low in the tractor part of a semi-truck which is seen as essential by truck operators. But in fact, this embodiment raises the engine, separates it from the tractor and puts it at the rear. The problem of blocking access to the payload box will be addressed later. The rule to be discussed relative to FIG. 4 is the explanation that must bring operators to understand that safe handling is preserved in this novel arrangement.

The explanation here provided uses FIG. 4 develop acceleration vectors, starting with, velocity vectors 44, 48, 51 that indicate forward travel that is initially the same for all respective wheels 42, 45, 49. From the starting condition of straight ahead travel, an abrupt turn initiating action is imposed. The front wheels are shown at the resulting turn initiating angle. For illustration purposes the wheel pivot angle is portrayed as an instantaneous change that instantaneously results in a new wheel direction vector 51 and the velocity vectors are shown in the first instant before time has passed. Following the assumption of this theoretical situation, in the first instant after that turn, the wheel 49 must continue to have a forward directed component of its velocity that is unchanged, so the new velocity vector would have to actually increase in magnitude. A direction change velocity vector 53 had to be added to the original forward travel vector 50 to cause the new vector 51. If that could be a finite lateral velocity change in a zero time, it would require a lateral acceleration 55 that was infinitely large. An actual time of transition would limit this to a finite acceleration. Over that actual transition time during which the right front wheel 49 and its left counterpart actually pivot, there is a pivoting rate that determines the derivative of change vector 53 with respect to time, which is of course, the governing high lateral acceleration 55. While that governing lateral acceleration 55 is not infinitely large, it is clear that it could be very large and could easily lead to excessive and dangerous forces if it acted on a large mass. Forces on the engine mass translate to forces at the base of the tires and these could cause a roll torque about the center of gravity of the overall vehicle. Where this roll torque exceeded the restoring effect of the vehicle weight, the vehicle would roll about the axis established by the tire contact points. The importance of keeping mass away from such governing lateral accelerations is thus established. It explains a particularly critical reason why engines in conventional trucks are mounted as low as possible.

There would have to also be a retarding force that would act over the actual time of transition to prevent the wheel direction velocity vector from increasing much in magnitude, but this would not have a destabilizing effect, so it is not of concern here. So, it is now appropriate to discuss how mass is positioned in the present invented vehicle to avoid the effects of the governing high lateral acceleration 55.

In the invented arrangement, the high lateral acceleration 55 affects this articulated form according to how it carries through the vehicle and how mass is arranged. The under-carriage 11 acts around a vertical center of rotation axis 58, which is defined through a point between the two rear carriage wheels indicated by line 46 at road contact point of right rear carriage wheel 45. The under-carriage 11 acts as a lever only since its mass is made approximately zero by the arrangement here invented. Lateral acceleration 59 at this axis 58 is zero, though it is shown as a very small vector 58 for discussion purposes. Now of interest is the acceleration 57 at the two axis joint connecting carriage 11 and main body 1 at a vertical, joint yaw axis 56 which is magnitude of the frontal, large lateral acceleration 55 reduced by a factor that is the ratio of a distance from vertical axis 56 to rotation axis 58 and a distance from large lateral acceleration 55 to the same rotation axis 58. Stability of the main unit body is greatly aided by reduction of accelerations from that of the governing lateral acceleration 55 and the two-axis joint acceleration 57. The lateral force at this joint would be determined by a moment of inertia analysis, but the result would be similar to that for a conventional semi-truck. To directly get to the point here, we can skip to determining lateral acceleration 64 of concentrated mass of engine 5 through its center of gravity indicated by vertical line 63 through engine midline indicated by line 62. For the main unit body there is a different center of rotation 60 having zero lateral acceleration 61. However, the acceleration of main interest 64 at the engine 5 is reduced by a factor that is the ratio of a distance from engine center 63 to main body rotation axis 60 and a distance from two axis joint position 56 to the same rotation axis 60. Noting that engine acceleration vector 64 is reversed because the engine is behind the rear wheels, and this could impart a force on engine 5 that would act as a corrective righting moment, the possible benefit of this has to be carefully evaluated in connection with an increased destabilizing force at the two axis joint that would grow as the engine was moved further rearward. Whatever the exact placement of the engine 5 relative to rotation axis 63 is determined to be, the force that results on that engine 5 determines the forces at the bases of the right wheels 42, 45, 49 that act to overturn the vehicle. Obviously if the engine acceleration 64 is made small, the impact of the engine mass on lateral forces that tend to cause overturning effects will be made small. There is a requirement for rigidity about the roll axis of the vehicle so that the benefit of engine weight as a downward force that enhances stability will remain wherever it is placed.

The complex discussion above can be made more intuitively understandable by considering that the conventional semi-truck tractor part has been significantly changed by removing the engine from its frame. Thus, drivers that appreciate benefits of the low frontal engine when making quick turns might understand that this would no longer be a concern. The rear engine would still provide positive stabilization due to its weight, but would not be subject to the kind of lateral accelerations that are a concern with the conventional arrangements. Even though the engine base indicated by line 40 is at a height 41 above the road so that airflow under it is unimpeded, the minimized lateral acceleration 64 prevents this from being a stability problem.

Figure 11:
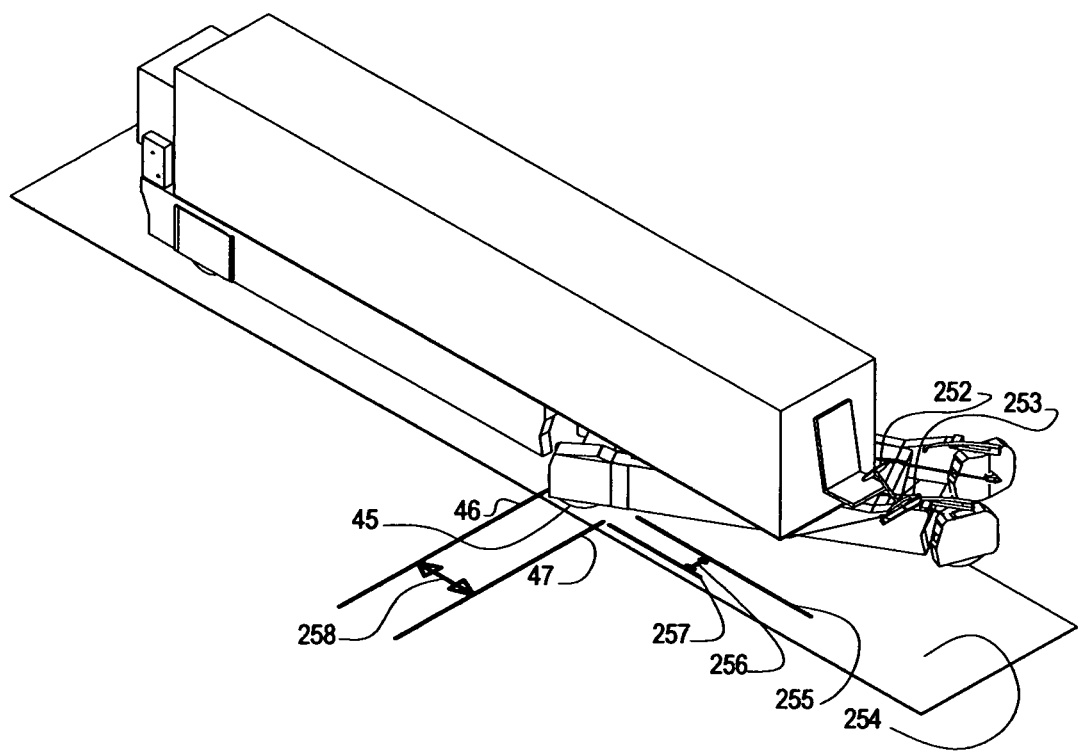
FIG. 11—Large truck with articulated wheel system in full turning process showing stabilization due to extension of middle, outside wheel, with front and rear outer fairings removed to enable view.

Having dealt with the stability issue with respect to the operation when a turn is just being initiated, the next condition that must be addressed is that of operation when turning has progressed into a constant turning radius situation. Later discussed FIG. 11 depicts this situation. This condition is made worse by the measures taken to improve matters regarding the turn initiation situation. The approach used to gain back stability for this constant turning radius situation relies on the wheel train compartments 74, 78 which are made heavy as structure and by adding batteries within these compartments. Weight in the forward enclosure 78 is especially effective since that is especially well positioned in a turning configuration. This violates the assumption of zero weight for the under-carriage 11 whereby it only acts as a lever. This is a minor violation however, since the weight added in the wheel train compartments would be at a very low level, such that lateral forces would develop only small overturning torques.

The under-carriage or carriage 11 of FIG. 4 is further defined in FIG. 5(a) by right carriage wheels 45, 49 and their left side counterparts, along with right enclosure 78 and its left side counterpart, together with connecting structures represented by horizontal airfoil 87 and other such links bridging from left to right. Thus, the under-carriage 11 is an approximately rigid frame. Forward right wheel 49 and left counterpart control operation of this under-carriage 11 wheel system as if it were a conventional automobile or a tractor of a conventional semi-truck. Right rear carriage wheel 45 and left counterpart are not drive wheels, though they could be as a part of an auxiliary propulsion apparatus. The linking two axis joint is shown as its lower half 89 where the upper part is fixed to the main body, now not present. Again, this is a load bearing linkage that functions like that used in conventional semi-trucks, and all variations of that are relevant equivalents for particular designs.

Since the control station is not fixed to the under-carriage a very different steering arrangement is needed. This is visible in FIG. 5(a) with steering wheel 85 linked on a steering column attached to a drum 84 which acts as a lever. Thus, a right turn would involve a usual turning of the steering wheel which would pull on a steering cable 80 attached to a disc 89 which pivots about an axis fixed to the underside of the main body. The steering cable runs through fairlead blocks as represented by a left such block 83 as would be appropriate for steering cables. The cables are arranged as they are because of the need to move the steering station to enable access to the payload compartment which is a later discussion. When the right cable 80 is thus pulled on, this causes disc 88 to rotate, thereby causing a push-rod 79 to push on a right steering lever, opposite to visible left steering lever 99, and this causes the right front wheel to pivot. The left front wheel operates in concert and the wheels act together to force the carriage to turn to the right. A Push rods are caused to push or pull as appropriate for right or left turns. Pivot point of disc 88 is located in proximity to the pivot point of the two axis joint 89 so that turning angle relationships are not overly complicated. Ideally, the axis of disc 88 and the vertical axis of two axis joint 89 would be coaxial. Any arrangement, hydraulic, electric, or mechanical that provides an approximate function as described is an equivalent under this invention. This was described previously in U.S. Pat. No. 7,338,061 Bullis, Mar. 4, 2008. There depicted was a tiller approach that clarified operation, thus showing an unexpected benefit of a remarkably stable steering process that developed out of the articulated arrangement of this prior invention.

Forward wheel train compartments represented by right compartment 78 are part of the carriage and turn with that carriage. Thus, braces such as brace 87 and such not visible must act with those forward wheel train compartments to maintain a rigid carriage frame, as previously stated. Front carriage wheels on this rigid frame have to be mounted with a mechanism 98 to enable them to pivot while still having vertical motion flexibility so as to enable spring suspensions. Control arm 82 enables such vertical action. Other wheels are attached flexibly to enable vertical spring action as represented by that spring arrangement 94 for the rear wheel of the main body, where cross airfoil 75 acts with the rear axle within. All wheels are enclosed in wheel fairings such as fairings 72, 77, 81. Detail of these functions follows known practice in design of large truck configurations, and draws from history of that field.

Top of rear parts of wheel train compartments act as structural support for main unit body 1 which is also known here as a trailer. That body 1 must include sufficient structural capability to maintain its own integrity forward, where it is over the carriage 11 which has to be free to move about the two-axis joint 89. Structural integrity includes a requirement to support the load intended and to hold rigidity, especially with regard to roll motion.

Figure 5:
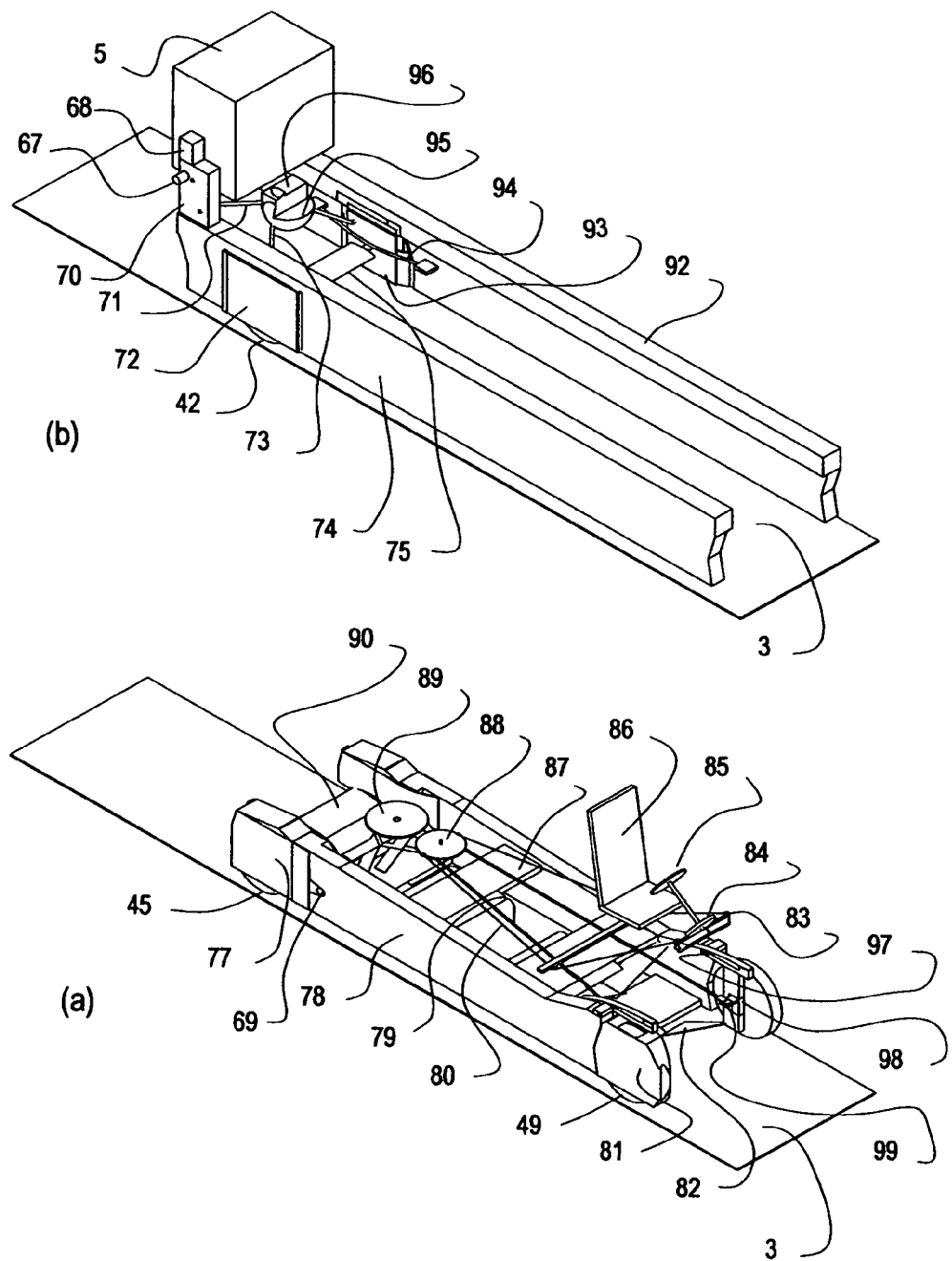
FIG. 5(a)—Front part of high efficiency vehicle with articulated wheel set and control station internals with detail made visible by removal of unified aerodynamic body shell and payload compartment, thereby showing essential underbody equipment.
FIG. 5(b)—Rear part of articulated wheel set and engine arrangement with unified aerodynamic body shell and payload compartment removed.

Engine 5 and rear drive train details are also shown in FIG. 5. Transmission 70 is linked with upper shaft 71 through constant velocity joints to differential unit 96, and then with similar joints to wheel gearboxes, as represented by left wheel box 93. Reduction gearing occurs in the wheel gearboxes. Rear axle is enclosed in a fairing 75. Rear axle and its fairing 75, and wheel gear box 93 are attached with a spring 94 to wheel train rear part 92.

Auxiliary electric drive parts include generator 67, electronic control unit 68, motor with drive 69 to rear undercarriage wheel 45 is shown. Batteries are carried in wheel train enclosures 78, 74. Electrical wiring is not shown. The only wiring issue of unusual nature is the need to connect through the two-axis joint 89, where this connection is represented by hole in the joint top so wires could run coaxially with the joint vertical axis in a hollow part. The engine 5 is reduced in size and its center of gravity lowered because this auxiliary arrangement enables a smaller engine than otherwise would be required. Of course, a major purpose of the aerodynamic efficiency of the whole vehicle is to reduce the engine 5 size.

Figure 6:
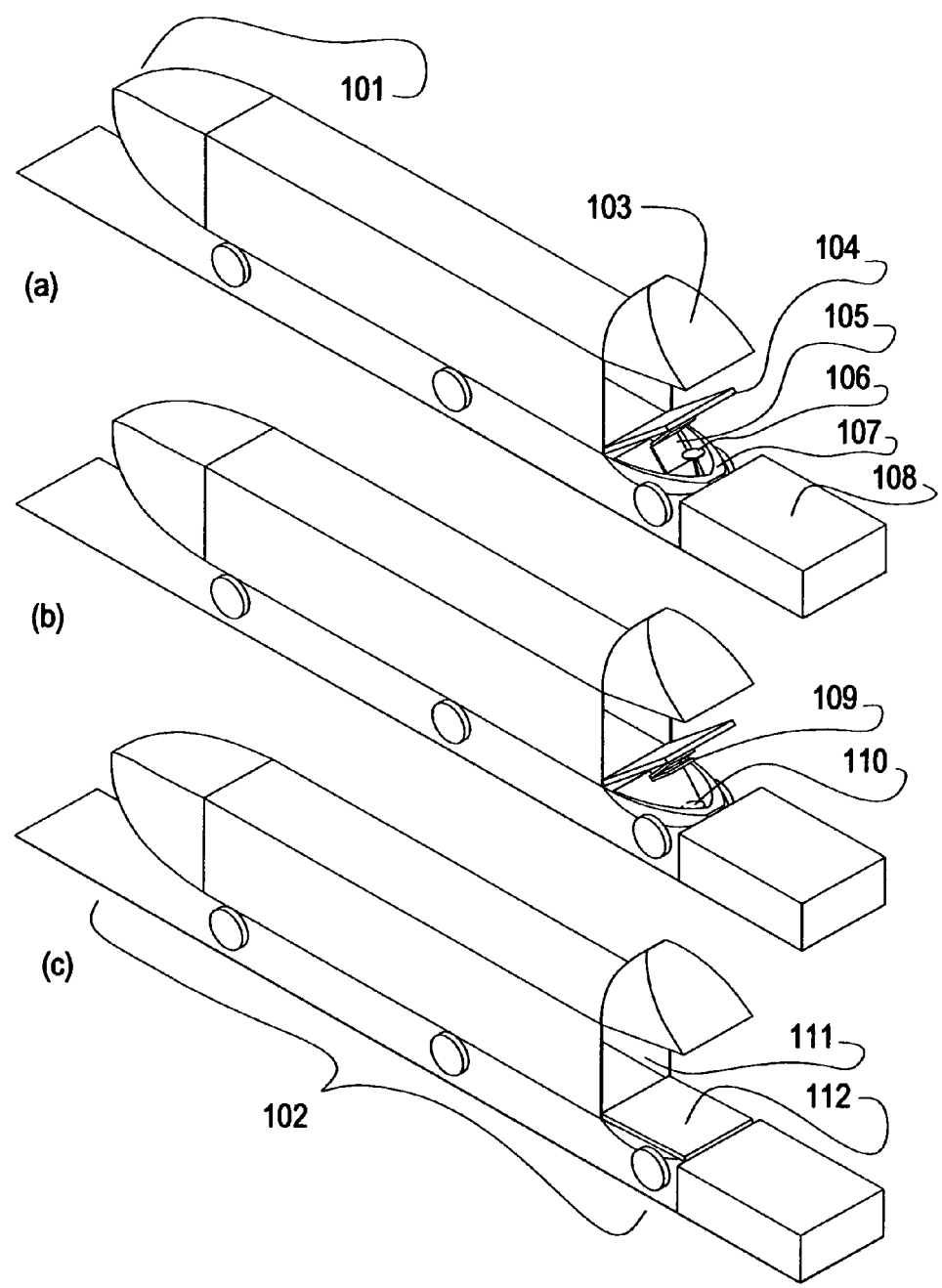
FIG. 6(a)—Frontal opening of large truck showing ramp partially lowered and deploying to loading dock.
FIG. 6(b)—Frontal opening of large truck showing ramp partially lowered and deploying to loading dock, where seat and steering apparatus are collapsed to enable full deployment.
FIG. 6(c)—Frontal opening of large truck showing ramp fully deployed to enable loading.

FIG. 6 explains the novel front access provisions motivated by the fact that the rear engine and the rear shaped fairing 101 now prevent the usual access to trucks. For a large articulated truck 102 the shape of the enclosure for control station equipment 6, as previously pointed out in FIG. 2 is now described. It is formed as a two part shell that forms the aerodynamic fairing 172 of FIG. 1. It has an upper shaped cowling 103 and the shaped lower part 107. This two part shell forms the front fairing forming the aerodynamic shape at the front of the main unit body 1 of FIG. 1. This two part shell opens by hinging action at the top and bottom front of the payload box 4 of upper shaped cowling 103 and shaped lower part 107, respectively. FIG. 6(*a*) shows the upper shaped cowling 103 in an opened position revealing the control station components of driver's seat 105 and steering wheel apparatus 106. The end gate 104 of the payload compartment is partially swung down. The driver's seat 105 is mounted on this end gate 104. The vehicle 102 is positioned with its nose at loading dock 108. FIG. 6(*b*) shows the steering wheel collapsed 110 and the driver's seat folded 109 against the end-gate 104, thereby enabling that end-gate 104 to become the ramp 112 of FIG. 6(*c*). Now the loading ramp 112 reaches to the loading dock 108 and loading activity is enabled over the collapsed control station parts 105, 106. Thus, access into the payload space 111 becomes comparable to the more familiar access to truck cargo space from the rear.

Figure 7:
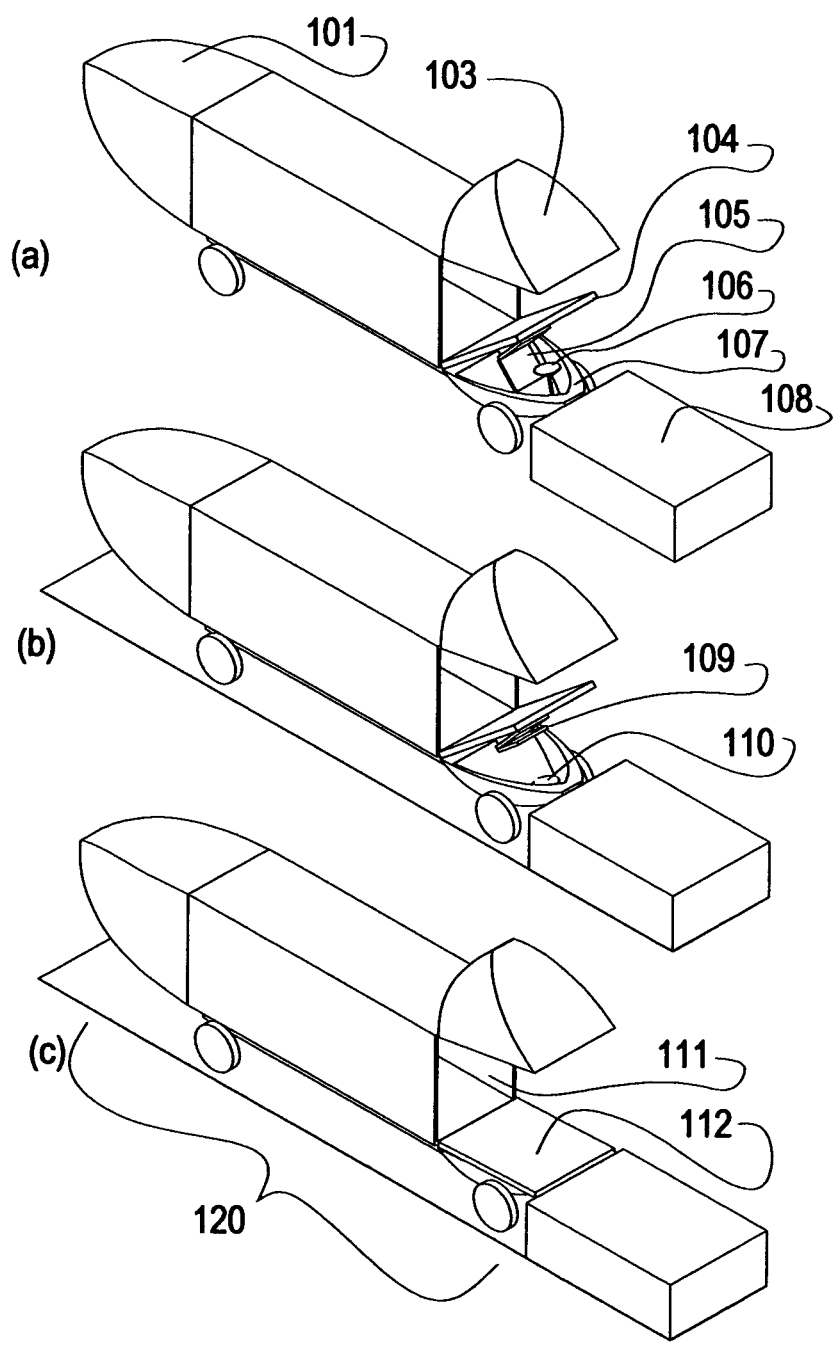
FIG. 7(a)—Frontal opening of short straight truck showing enclosure opened and ramp partially lowered as it is deploying to loading dock.
FIG. 7(b)—Frontal opening of short straight truck showing ramp partially lowered and deploying to loading dock, where seat and steering apparatus are collapsed to enable full deployment.
FIG. 7(c)—Frontal opening of short straight truck showing ramp fully deployed to enable loading.

The front loading provisions shown in FIG. 7 are the same as shown in FIG. 6 except the vehicle is now a single part vehicle 120 as would be the familiar straight truck. This vehicle also represents the invented concept. Parts 101, 103-112 are the same but they are simply attached to a shorter body having simpler dynamics.

Figure 8:
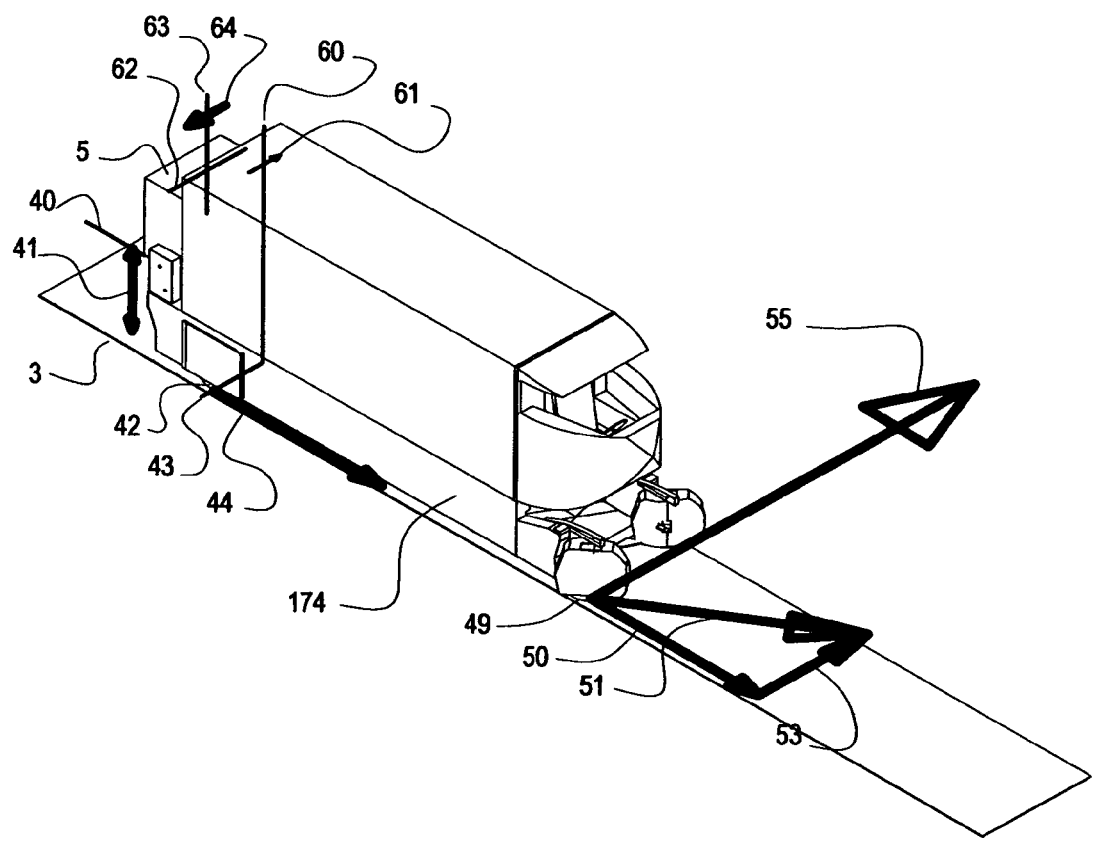
FIG. 8—Straight truck initiating a turn, with illustration of velocity and acceleration vectors explaining rule for overcoming instability of high engine, with resulting engine position near rear wheels.

The simpler dynamics of the straight truck are discussed relative to FIG. 8, where the same initiating lateral acceleration vector 55 is generated by the abrupt change of velocity indicated by that change vector 53 that adds as vectors to initial velocity vector 50 to cause a new direction velocity vector 51. As with the articulated vehicle case, in the instantaneous nature of this representation the magnitude of new direction velocity vector 51 would slightly increase over magnitude of initial velocity vector 50 though as before this is an oversimplification of the actual actions over time, though it is still useful in explaining how very high accelerations like that of lateral acceleration vector 55. The acceleration 63 of the engine 5 is simply determined by the longitudinal distance form the engine center line 62 to the rotation center 60 divided by the longitudinal distance from the rotation center 60 to the position of that initiating lateral acceleration 55 vector multiplied by the magnitude of that lateral acceleration vector 55. The acceleration 63 of the engine 5 can be made arbitrarily close to zero by appropriate placement ever closer to the rotation axis 63. The force that results on the engine 5 is thus made arbitrarily small. And the forces at the bases of the right wheels 42, 49 that result from this force on the engine 5 are the forces that act to overturn the vehicle. Obviously if the engine acceleration 64 is made small, the impact of the engine mass on lateral forces that tend to cause overturning effects will be made small. There is a requirement for rigidity about the roll axis of the vehicle so that the benefit of engine weight as a downward force that enhances stability will remain wherever it is placed. Of course, a complete analysis of forces is left to the detailed implementation process for particular applications, as would be carried out by those skilled in that art.

In the illustration of FIG. 8 the engine is rearward of that rotation axis 63 so as to not invade the payload space while keeping the rear wheels under the payload space. This is a design parameter that will vary with different applications as implemented by those skilled in such activities.

Figure 9:
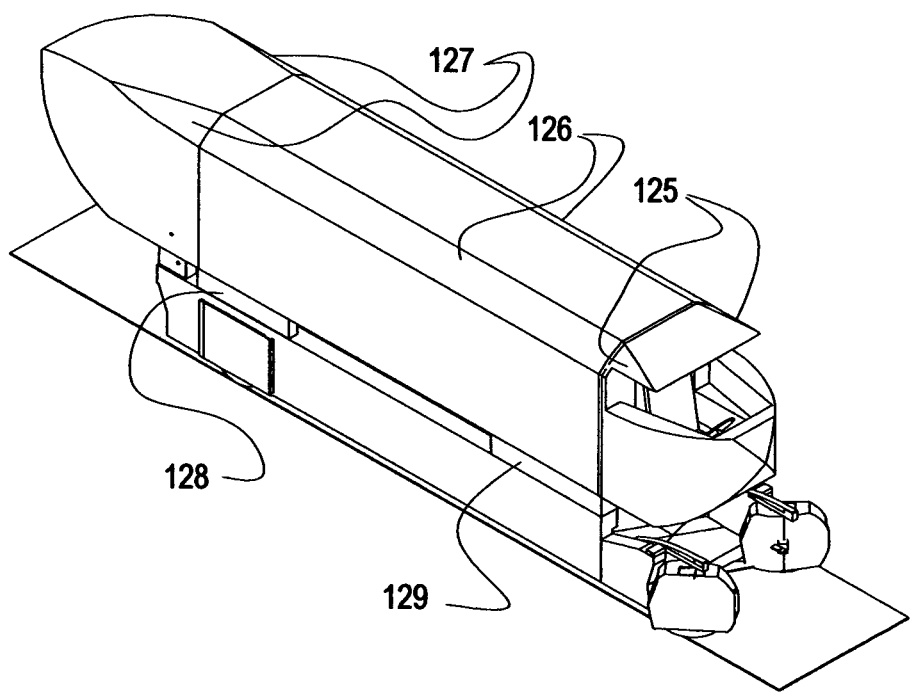
FIG. 9—Straight vehicle with rounded edges to more closely approximate body of revolution shaping, with struts connecting wheel train aerodynamic units to main body aerodynamic unit.

FIG. 9 represents other aerodynamic bodies. Most illustrations here have shown vehicles based on a rectangular payload box like that of conventional trucks. Fore and aft fairings 172, 171 were shown that blended without changing the payload box section, where this blending with a form from present day trucking is seen as an early embodiment. Going further in time, this FIG. 9 shows a simple modification to the standard payload box where corners are rounded with resulting changes of shape 125, 126, 127 shown, that also represent corresponding changes at lower edges. Vertical struts 128, 129 connect from the shaped underneath body to the wheel train units. The underneath shaping serves to enable radial expansion of the airflow under the vehicle, thus minimizing confined aerodynamic flow.

This form indicated in FIG. 9 moves closer to the ideal airship such as the USS Akron, as represented by a long series of wind tunnel test models. Notable in this tradition is a simple variation in form where a refined low drag body is simply extended by inserting a cylindrical mid-section, where this variation comes with minor increase in aerodynamic drag. This approach is visible in modern commercial airliners, sometimes referred to as a "stretch" version of a previous model. The examples of this disclosure are intended to show that the single unit body 1 represented in FIG. 1 have many variations.

Figure 10:
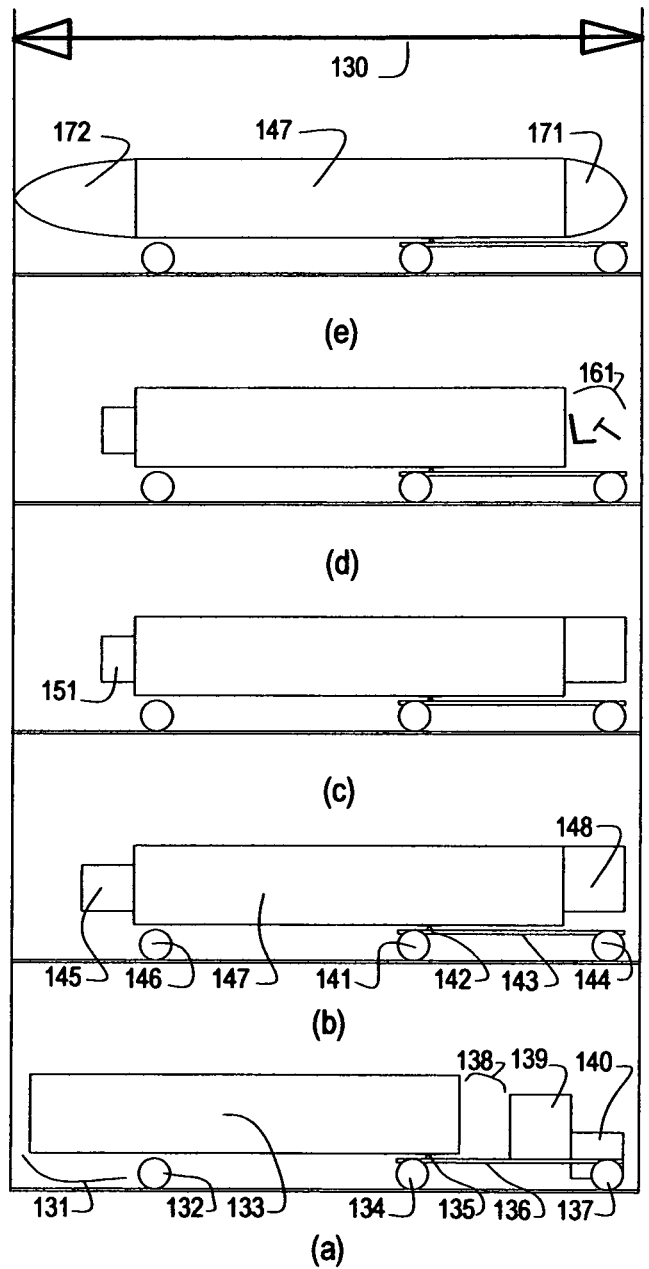
FIG. 10(a)—Simplified diagram of conventional semi-truck.
FIG. 10(b)—Semi-truck has payload box shifted forward, engine is removed from tractor and placed behind payload box, and control station of semi-truck is rigidly attached to front of payload box thereby leaving only the wheel apparatus of the tractor part of the semi-truck in its original position.
FIG. 10(c)—The semi-truck sized engine is turned to have a transverse crankshaft and engine is reduced in size.
FIG. 10(d)—Original control station enclosure of tractor is removed exposing seat and steering apparatus.
FIG. 10(e)—Tapered enclosures are attached to front and rear of payload box to form a rigid aerodynamic body that retains the same payload box, unchanged. The arrow indicates the overall length of the resulting vehicle is approximately the same length as the original semi-truck.

Applicability to the heavy cargo transportation sector is made clear by the comparative sequence of FIG. 10. Here shown is a sequence of improvements that makes the conventional semi-truck a high efficiency vehicle without exceeding familiar weight limitations, yet keeps the same size payload box 133. FIG. 10(a) is a simplified representation of the main parts of that conventional vehicle. The trailer 131, having rear trailer wheels 132 and payload box 133, is connected to tractor frame 136, having rear tractor wheels 134 and front tractor wheels 137, with a two-axis joint 135. Tractor cab 139 and engine unit 140 complete the semi-truck representation. Notable is the space 138 between tractor cab 139 and payload box 133. FIG. 10(b) shows the semi-truck engine unit configuration except now it is a rear engine unit 145 attached to the rear of a moved payload box 147, and a moved cab that is now a control station 148 attached to the new payload box 147. FIG. 10(c) is now revised where a transverse engine 151 replaces moved engine 145. FIG. 10(d) shows that the box shaped tractor cab has been removed exposing the essential control station apparatus 161. Addition of aerodynamically shaped fairings 171, 172, fore and aft, attached to the moved payload space 147 establish the single aerodynamic unit body. Overall length indicator 130 shows that the resulting vehicle of FIG. 10(e) is approximately unchanged relative to the conventional vehicle of FIG. 10(a) while the respective payload spaces 173, 133 are maintained at the same dimensions to carry the same cargo.

FIG. 4 described the initiation of a turning action while FIG. 11 shows the ensuing action of a continuing turn, with covers removed to aid description. This illustration serves to remind the designer of other stability effects. As before shown in FIG. 4, steering wheel 252 has linkage 253 to front wheels. To get to the configuration here in FIG. 11, that steering wheel continued to be turned after it had initially caused the front wheels to pivot in the turn initiation action of FIG. 4. In the straight line travel mode, the rear under-carriage wheels have a road contact point even with the line 46 that is offset by a longitudinal distance 258 from the two axis joint attachment point indicated by lateral line 47. Offset distance 258 determines how far the right wheel 45 extends to the right, where this extension distance 256 is the distance between straight travel track 255 and extension indicator line 257. The roadway shown is a wider roadway 254 than shown in previous illustrations.

The beneficial effect of that extension distance 256 to the outside of a turn is lessened by the rear placement of the engine. Cargo having weight forward such that it rests heavily on the lower under-carriage enables a larger upward force on extended wheel 45 but this is a variable not to be depended on completely. Previously mentioned in discussion relative to FIG. 4 was the use of weight in wheel trains compartments, especially the forward compartments such as the right forward compartment 78 will keep the forward part of the vehicle held downward. This is an opportunity to carry batteries to supply auxiliary power to supplement engine output for peak load situations.

Figure 12:
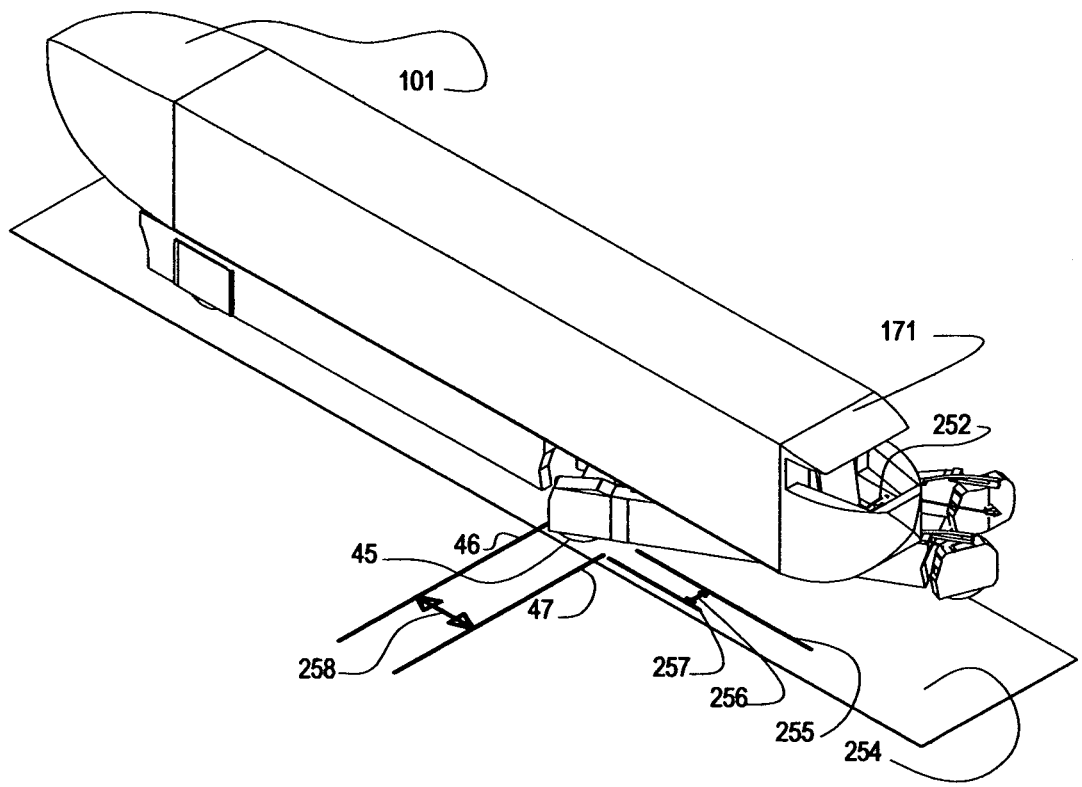
FIG. 12—Large truck with articulated wheel system in full turning process showing stabilization due to extension of middle, outside wheel., with front and rear outer fairings removed to enable view.

FIG. 12 is a vehicle like that of FIG. 11 made whole by addition of aerodynamic shapes 101, 171.

It is known in the field of fluid dynamics, including aerodynamics, to refine ultimate shapes using computational methods. Analysis such as this would guide those skilled in the art implementing refinements of the present invention. Combination effects that occur with multiple bodies in mutual proximity are particularly subject to such analysis, leading to shape deviations of bodies to compensate for influence of other bodies. Aircraft bodies are necked down in vicinity of wings and sailboat underbodies are indented in vicinity of keels to implement such compensating measures.

The examples discussed here and equivalents represent the invented concept. However, the specifics of these examples should not be construed as limiting the scope of the invention.

The scope of the invention should be determined by the appended claims and their legal equivalents, rather than by the examples given.

I claim:

1. A high efficiency vehicle for traveling on a road surface, comprising:
    a main body including front and rear ends having tapered surfaces;
    a wheel system including at least front and rear wheels disposed below the main body such that a lowermost bottom portion of the main body is suspended completely above the front and rear wheels, wherein the wheel system further includes underbody support structure extending in a longitudinal direction of the vehicle;
    a control station disposed within the main body and located at the front end of the main body, the control station including at least a driver's seat for accommodating a driver of the vehicle and a steering device for operably steering at least the front wheels, the control station configured to be selectively folded downwardly such that at least a vertical portion of the driver's seat becomes oriented substantially horizontally;
    an engine for driving the vehicle disposed within the main body and located at the rear end of the main body;
    a payload space, configured to carry and transport cargo, disposed within the main body and located forward of the engine and rearward of the control station;
    a planar element separating the payload space and the control station, the planar element configured to be selectively foldable between a substantially vertical upright orientation and a substantially horizontal orientation;
    wherein the front end of the main body includes upper and lower portions configured to selectively separate and provide access for loading and unloading cargo into and out of the payload space of the vehicle; and
    wherein, in order to facilitate the loading and unloading of cargo into and out of the payload space of the vehicle, the upper and lower portions of the front end of the main body are separated to provide access into the vehicle through the front end of the main body and both the planar element and control station are folded downwardly such that the planar element and at least the vertical portion of the driver's seat become oriented substantially horizontally so that the planar element functions as a ramp during the loading and unloading of cargo into and out of the payload space of the vehicle.

2. The high efficiency vehicle according to claim 1, wherein the main body is an aerodynamic closed shell that encloses the control station, the payload space and the engine during vehicle travel.

3. The high efficiency vehicle according to claim 1, wherein the engine is configured to drive the rear wheels.

4. The high efficiency vehicle according to claim 1, wherein the underbody support structure substantially encloses the front and rear wheels from air flow during vehicle travel.

* * * * *